No. 767,835. PATENTED AUG. 16, 1904.
J. M. RAOUL.
SUBMARINE SALVAGE VESSEL.
APPLICATION FILED MAR. 31, 1904.
NO MODEL.
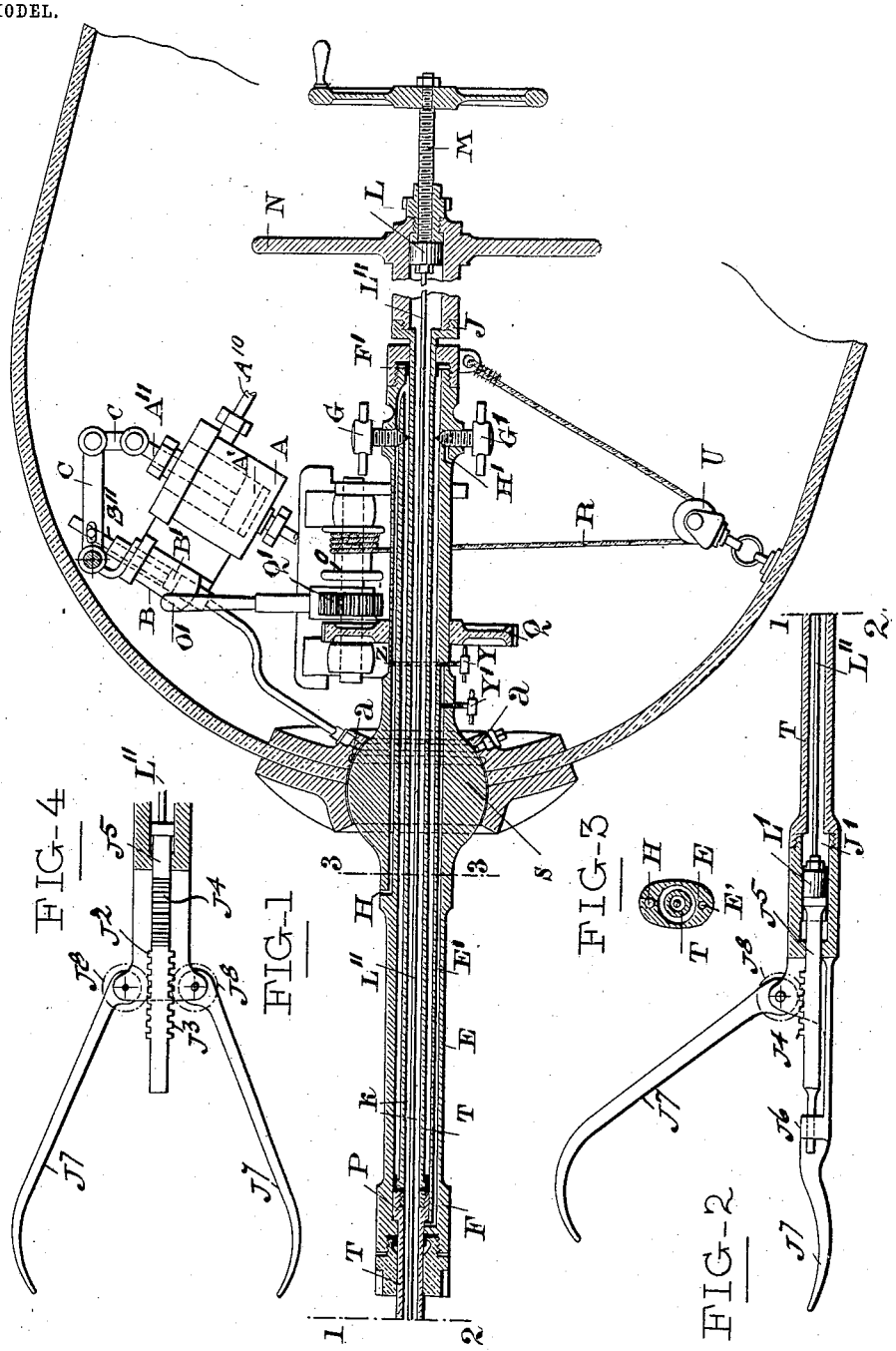
Witnesses
Inventor
Jean Marie Raoul No. 767,835. Patented August 16, 1904.

UNITED STATES PATENT OFFICE.

JEAN MARIE RAOUL, OF TUNIS, AFRICA.

SUBMARINE SALVAGE VESSEL.

SPECIFICATION forming part of Letters Patent No. 767,835, dated August 16, 1904.

Application filed March 31, 1904. Serial No. 200,997. (No model.)

*To all whom it may concern:*

Be it known that I, JEAN MARIE RAOUL, a citizen of the French Republic, residing at Tunis, Africa, have invented certain new and useful Improvements in Submarine Salvage Vessels, of which the following is a specification.

This invention relates to improvements in submarine vessels adapted to be submerged and operate at any depth for cutting, removing, and raising sponges or shells of any kind, and generally any objects submerged in the sea, rivers, lakes, and the like. The different systems hitherto in use all present serious inconveniences resulting from the difficulty of bringing the interior pressure in equilibrium with the exterior pressure, which prevented the movements of the cutters, nippers, or other instrument at certain depths.

The object of this invention is principally to provide means for equilibrating the pressure at the pivotal point of the nippers and at the same time provide a novel arrangement of the parts operating said nippers.

The hull of the vessel can be of any suitable form and be provided with any convenient means for enabling it to be submerged and to again rise to the surface and for carrying out the movements under water in any direction, these means forming no part of the present invention.

In the annexed drawings, Figures 1 and 2 are sections showing the nippers or similar instrument pivoted at the forward part of the vessel with their operating mechanism, the line 1 2 indicating the point of connection with Fig. 2. Fig. 3 is a section on line 3 3 of Fig. 1, and Fig. 4 is a section of a modified form of nippers which can be employed.

The means for gripping and removing objects, such as mineral bodies or plants, consist of a pair of nippers which can oscillate in any direction around a ball or central nut S, forming a joint, and in which one or more grooves $a$ are provided for reception of lubricant compressed in such a manner that taking into account the ratio of the surface areas the pressure of oil in the interior substantially equilibrates the exterior pressure of the water. In order to obtain this pressure of oil, two cylinders A and B are used, each having a piston $A'$ $B'$, respectively provided with a rod $A^{11}$ or $B^{11}$. The surrounding water acts on the first and largest of the two pistons $A'$, the oil being compressed by the smaller piston $B'$. The said piston $A'$, which receives the pressure of the surrounding water through a pipe $A^{10}$, leading from any part of the exterior of the vessel to the cylinder A, transmits it at an increased degree to the oil of the second piston by means of the piston-rods and an angle-lever C. The ratio of the surfaces of the pistons $A'$ $B'$ multiplied by the ratio of the levers through which the piston-rods act on each other will be equal to that of the acting surfaces of the surrounding water on the outer half of the central nut or ball S and to that of the reaction of the oil in the grooves $a$ on the inner half of the said nut or ball. The central hollow rod or tube T of the nippers, with which the operator in the interior of the vessel works on the sea-bottom, receives its longitudinal movement by the pressure of the surrounding water itself and moves to and fro. This movement is produced by the following means: The rod carries at a suitable point of its length an enlargement forming the piston P, and the body of the nippers is formed as a hollow cylinder E, carrying at a suitable point the ball-joint S and in which the rod T moves. It terminates in two stuffing-boxes F F'. The interior diameter of the body or cylinder E is the same as that of the enlarged part forming the piston P, referred to above. Its ratio to the exterior diameter of the rod T is such that the surrounding water introduced into the interior of the cylinder E and pressing on the piston causes the latter to advance notwithstanding the resistance of the surrounding water, which exercises a counter-pressure on the surface of the rod sliding in the outer stuffing-box F. The diameter of this part of the rod is the same as that of the piston P in the ratio suitable for obtaining the movement indicated. The forward movement will take place as soon as the channel H is opened by means of the screw-valve G, said channel being in the wall of the cylinder E and communicating with the surrounding water. The backward movement takes place as soon as the inlet of the surrounding water is interrupted, and an orifice H' in the wall of the body of the nippers is opened by means of a screw-valve G', so as to allow the water which served for the forward movement to escape into the interior of the vessel.

On the extremity of the rod T and also movable in a longitudinal direction certain instruments are placed for the different operations desired, the movement of which instruments is obtained as follows: The rod T at its part inside the vessel carries a hollow enlargement J, forming the body of a pump. The rod T is provided for the whole of its length with a bore $k$ of small diameter, which is filled with water. The water in the enlargement inside the vessel is adapted to be compressed by a piston L and a screw-spindle M, provided with a hand-wheel. The piston transmits pressure to the outer part of the rod T, which is provided with a similar enlargement J', containing a piston L'. This latter piston operates three racks $J^2$ $J^3$ $J^4$, carried on one rod $J^5$, two of said racks being lateral and one vertical. (See Figs. 2 and 4.) Each of these is adapted to operate one of the implements required. The rod carrying the racks is guided at its end opposite the piston by a part $J^6$, forming an extension of the rod T. The claw or claws of the nippers $J^7$ each have a pinion $J^8$, adapted to gear with the rack or racks to be opened or closed according to the movements of the piston L'.

The rod T receives a universal movement of rotation on its own axis by simply operating a lever N, fixed at its end. The whole body of the nippers receives a similar rotary movement about its own axis when parallel with the axis of the drum O, fixed to the wall of the submarine, by the pinion Q, carried by said body, coming into gear with the pinion Q', the axle of which carries the said drum and is operated by means of a lever O'.

The whole body of the nippers can receive an oscillating movement around the center of the ball S in any direction, first, by the lever N, fixed to the inner end of the rod T, and, secondly, by a rope or the like R, connected at one of its ends to the inner part of the nippers' body and at its other end to the drum O. Between the two ends of the rope is a guide-pulley U, attached to a ring placed inside the vessel, so that any suitable movement can be carried out.

The part adjacent to the ball S is elliptical, (see Fig. 3,) so as to permit movements of greater amplitude in the direction of the smaller axis of the ellipse.

The thickness afforded by the larger axis serves for accommodating the small channel H, through which the surrounding water is introduced into the body of the nippers for obtaining the longitudinal movements of the central rod. If desired, the body E can be provided with a small channel E' in communication with the outer water by the channel H and branched from the said channel at Z. The said channel E' will serve for the discharge of water which might have entered at the stuffing-boxes and filled the empty space. Moreover, it will furnish water under pressure to assist the driving back of the rod T into the interior of the vessel when the object to be removed offers a great resistance. Cocks Y Y' will permit, respectively, the reception of the water from outside and the emptying into the interior of the vessel of the water which has been already used. Finally, the pistons L L' could be connected by a rod L'' in order to insure when working at a small depth that the branches of the nippers will open and close properly.

I claim—

1. The combination with a submarine vessel having a spherical bearing in its wall of a tool passing through said wall and having a spherical joint at its point of passage therethrough and means for forcing liquid between the inner side of said bearing and joint for balancing the pressure of the water on the outer side of said joint, substantially as described.

2. The combination with a submarine vessel having a spherical bearing in its wall of a tool passing through said wall and having a spherical joint at its point of passage therethrough and means for forcing liquid between the inner side of said bearing and joint for balancing the pressure of the water on the outer side of said joint said means comprising two cylinders of unequal diameter, pistons in said cylinders, rods connecting said pistons, means of communication between the smaller cylinder and the aforesaid spherical joint and means of communication between the larger cylinder and the exterior of the vessel substantially as described.

3. The combination with a submarine vessel having a hollow tool passing through its wall, of a central spindle within said tool, having an enlarged cross-sectional surface, instruments carried by said spindle, means of communication between the interior of the tool and the exterior of the vessel for admitting water to act on said enlarged surface for forcing said spindle outward, and means for discharge of said liquid from the tool into the interior of the vessel substantially as described.

4. The combination with a submarine vessel having a tool passing through its wall and provided with a universal joint at its point of passage therethrough, of toothed gear for rotating said tool on its own axis and a winch for oscillating said tool about the center of the universal joint substantially as described.

5. The combination with a submarine vessel having a hollow tool passing through its wall and provided with a universal joint at its point of passage therethrough, of a central spindle passing through said tool, instruments carried by said spindle, means for rotating said spindle on its axis comprising a handle at its inner end, means for rotating the whole tool about its axis and means for oscillating said tool about the center of the univeral joint substantially as described.

6. The combination with a submarine vessel having a hollow tool passing through its wall, of a central hollow spindle passing through said tool and adapted to contain liquid, differential pistons within said hollow spindle, multiple racks carried by one of said pistons, fixed and pivoted claws carried by said spindle, pinions on the pivoted claws adapted to gear with said racks, and means for exerting pressure on said pistons to reciprocate the racks and consequently open and close said pivoted claws substantially as described.

7. The combination with a submarine vessel having a hollow tool passing through its wall, of a central spindle passing through said tool, and provided with an enlarged cross-sectional surface, instruments carried by said spindle, means of communication between the interior of the tool and the exterior of the vessel for admitting water to act on the inner side of said enlarged surface to force said spindle outward, means for discharge of liquid from the tool into the interior of the vessel, and means of communication between the outer part of said enlarged surface and the surrounding water for assisting the back stroke of said central spindle substantially as described.

In witness whereof I have signed this specification in the presence of two witnesses.

JEAN MARIE RAOUL.

Witnesses:
 WM. ANDERSON,
 AMEDÉE GRANARA.